United States Patent
Jusko et al.

(10) Patent No.: US 10,904,271 B2
(45) Date of Patent: Jan. 26, 2021

(54) ACTIVE PRIORITIZATION OF INVESTIGATION TARGETS IN NETWORK SECURITY

(71) Applicant: Cisco Technology, Inc., San Jose, CA (US)

(72) Inventors: Jan Jusko, Prague (CZ); Jan Stiborek, Prague (CZ); Tomas Pevny, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 15/789,022

(22) Filed: Oct. 20, 2017

(65) Prior Publication Data

US 2019/0124094 A1    Apr. 25, 2019

(51) Int. Cl.
    *H04L 29/06*    (2006.01)
(52) U.S. Cl.
    CPC ........ *H04L 63/1416* (2013.01); *H04L 63/101* (2013.01); *H04L 63/1433* (2013.01)
(58) Field of Classification Search
    CPC ............... H04L 63/1416; H04L 63/101; H04L 63/1433
    See application file for complete search history.

(56) References Cited

U.S. PATENT DOCUMENTS

| | | | |
|---|---|---|---|
| 8,813,228 B2 | 8/2014 | Magee et al. | |
| 9,043,894 B1 * | 5/2015 | Dennison | G06F 16/9535 726/11 |
| 9,516,053 B1 * | 12/2016 | Muddu | G06F 16/254 |
| 9,672,355 B2 * | 6/2017 | Titonis | G06F 21/56 |
| 9,904,893 B2 * | 2/2018 | Veeramachaneni | H04L 63/1425 |
| 2005/0207413 A1 * | 9/2005 | Lerner | G06F 21/554 370/389 |
| 2009/0319518 A1 * | 12/2009 | Koudas | G06F 16/951 |

(Continued)

OTHER PUBLICATIONS

Boyd, et al., "Accuracy at the Top", NIPS'12 Proceedings of the 25th International Conference on Neural Information Processing Systems, 9 pages, 2012, Curran Associates Inc.

(Continued)

*Primary Examiner* — Carl G Colin
*Assistant Examiner* — Hany S. Gadalla
(74) *Attorney, Agent, or Firm* — Behmke Innovation Group LLC; Kenneth J. Heywood; James J. Wong

(57) ABSTRACT

In one embodiment, a device analyzes network traffic data using a clustering process, to identify a cluster of addresses associated with the network traffic data for which the associated network traffic has similar behavioral characteristics. The device calculates a set of rankings for the cluster by comparing the cluster to different sets of malicious addresses. The device aggregates the set of rankings into a final ranking by setting the rankings in the set as current rankings and iteratively calculating an average of any subset of the current rankings that comprises correlated rankings. The calculated average replaces the rankings in the subset as a current ranking. When none of the current rankings are correlated, the device performs an aggregation across all of the current rankings to form the final ranking. The device provides data indicative of the cluster for review by a supervisor, based on the final ranking.

20 Claims, 7 Drawing Sheets

(56) References Cited

U.S. PATENT DOCUMENTS

| | | | | |
|---|---|---|---|---|
| 2012/0167210 A1* | 6/2012 | Oro Garcia | ......... | H04L 63/1425 |
| | | | | 726/22 |
| 2012/0278477 A1* | 11/2012 | Terrell | ................ | H04L 41/5009 |
| | | | | 709/224 |
| 2013/0332109 A1* | 12/2013 | Luiset | ................ | H04L 63/1441 |
| | | | | 702/179 |
| 2014/0007238 A1* | 1/2014 | Magee | ................ | H04L 63/1408 |
| | | | | 726/24 |
| 2015/0301903 A1* | 10/2015 | Mutha | ................... | G06F 16/162 |
| | | | | 707/692 |
| 2015/0373043 A1 | 12/2015 | Wang et al. | | |
| 2018/0063170 A1* | 3/2018 | Truve | ................... | H04L 61/2503 |
| 2019/0124106 A1* | 4/2019 | Navarro | .............. | H04L 63/1433 |

OTHER PUBLICATIONS

Hoi, et al., "Semi-Supervised Ensemble Ranking", Proceedings of the Twenty-Third AAAI Conference on Artificial Intelligence (2008), 6 pages, 2008, Association for the Advancement of Artificial Intelligence.

Jusko, et al., "Using Behavioral Similarity for Botnet Command-and-Control Discovery", IEEE Intelligent Systems (vol. 31, Issue: 5, Sep.-Oct. 2016), pp. 16-22, 2016, IEEE.

Lazarevic, et al., "Feature bagging for outlier detection", KDD '05 Proceedings of the eleventh ACM SIGKDD international conference on Knowledge discovery in data mining, pp. 157-166, 2005, ACM.

\* cited by examiner

ACTIVE PRIORITIZATION OF INVESTIGATION TARGETS IN NETWORK SECURITY

TECHNICAL FIELD

The present disclosure relates generally to computer networks, and, more particularly, to the active prioritization of investigation targets in network security.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also is sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, performing a deep assessment of the maliciousness of each network entity can be extremely cumbersome and unworkable, in most networks.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
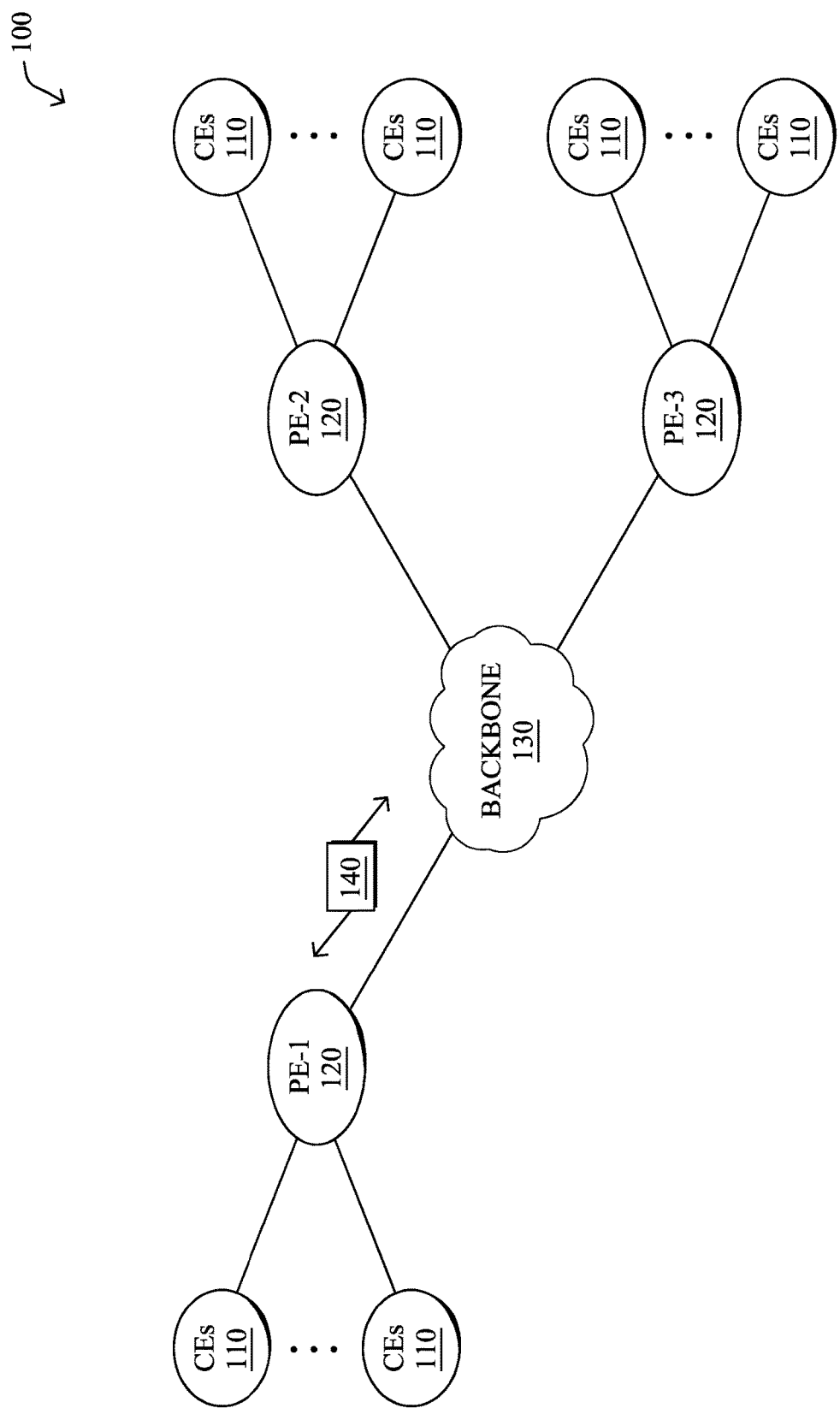
FIGS. 1A-1B illustrate an example communication network.

According to one or more embodiments of the disclosure, a device analyzes is network traffic data using a clustering process, to identify a cluster of addresses associated with the network traffic data for which the associated network traffic has similar behavioral characteristics. The device calculates a set of rankings for the cluster by comparing the cluster to different sets of malicious addresses. The device aggregates the set of rankings into a final ranking by setting the rankings in the set as current rankings and iteratively calculating an average of any subset of the current rankings that comprises correlated rankings. The calculated average replaces the rankings in the subset as a current ranking. When none of the current rankings are correlated, the device performs an aggregation across all of the current rankings to form the final ranking. The device provides data indicative of the cluster for review by a supervisor, based on the final ranking.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate is over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the is nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to is the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
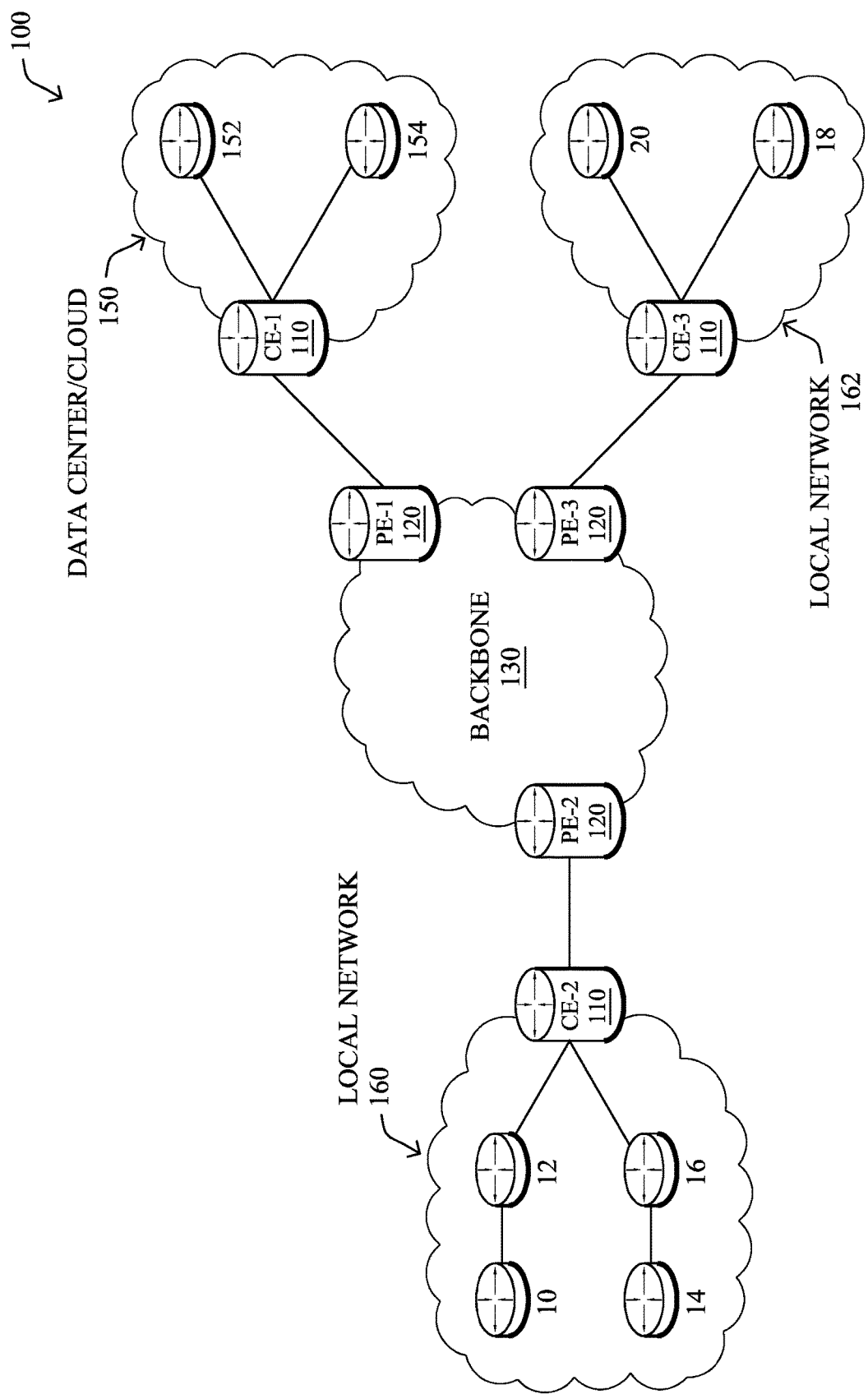

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
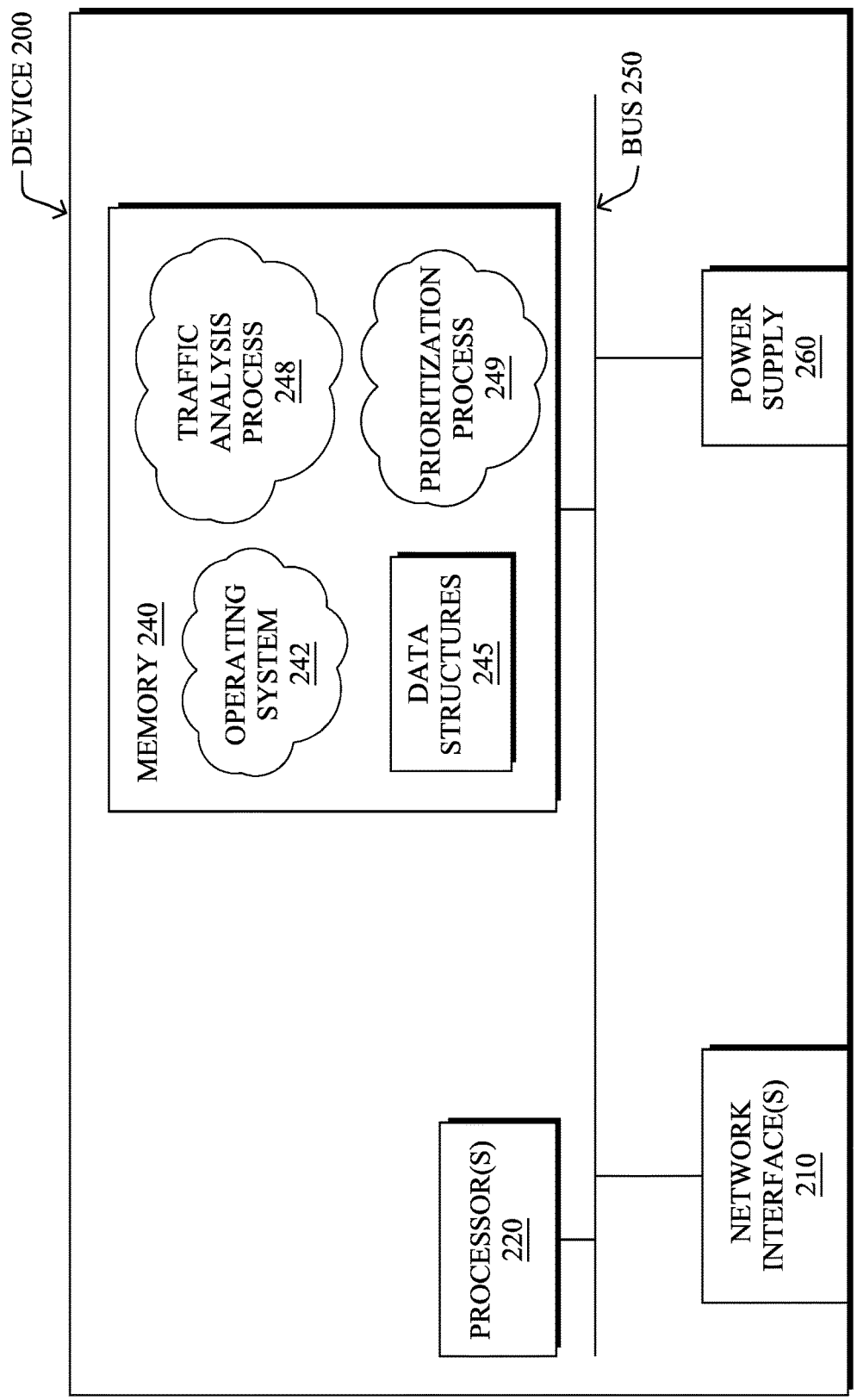
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248 and/or a prioritization process 249. In general, prioritization process 249 may operate in conjunction with traffic analysis process 248 to prioritize clusters of addresses identified by traffic analysis process 248 for review by a supervisor (e.g., a human analyst via a user interface, an automated or semi-automated review system, etc.).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratof true positives to the sum of true positives and false negatives, which quantifies the sensitivity of the model. Similarly, precision refers to the ratof true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
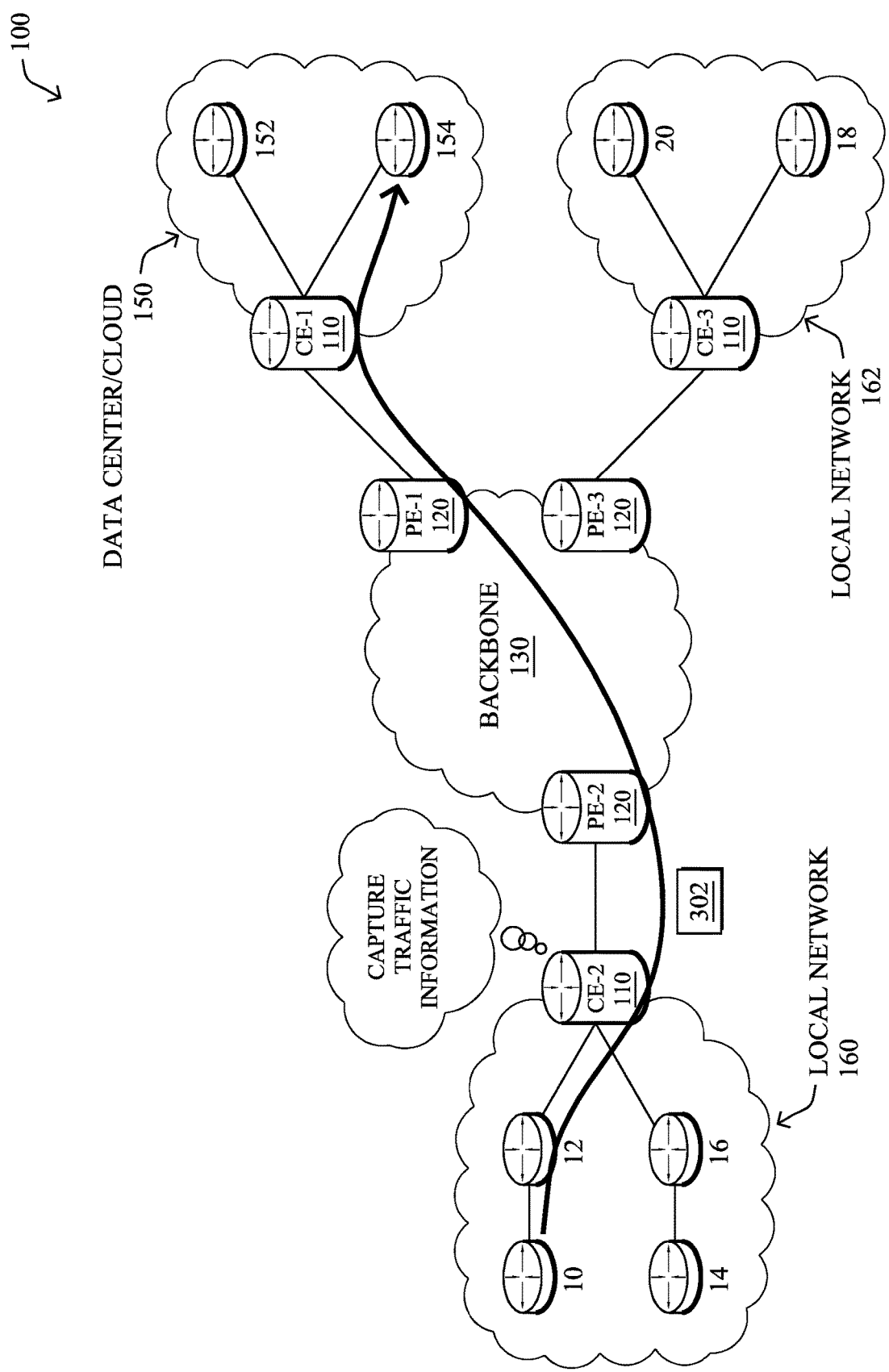
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, a deeper investigation of network traffic, such as by a supervisor (e.g., a human analyst, an automated or semi-automated review system), etc., is time consuming and cumbersome, due to the large amounts of traffic generated on even medium-sized networks. In some cases, learned predictors can be used to narrow the search for attack indicators and the like. In an ideal case, the supervised learning process would learn from large numbers of previously known attacks, to accurately predict new cases in future traffic data. This, however, is often unrealistic due to limited examples of past attacks and/or limited capture quality of past attacks.

In some implementations, unsupervised learning may be more effective for purposes of detecting and flagging suspicious traffic. Notably, unsupervised learning can be used for traffic analysis by detecting behavioral anomalies in the traffic flows. For example, sudden changes in the traffic characteristics (e.g., in terms of timing, packet sizes, endpoints, etc.) may indicate the presence of malware, malfunctioning devices, and the like. Unsupervised learning is also above to discover previously unknown forms of attacks.

While traffic analysis using unsupervised learning can be quite effective, the gathered insights can be voluminous and hard to interpret. For example, while a certain set of traffic may be "anomalous" from a machine learning standpoint, this does not mean that the traffic is malicious or otherwise a sign of a problem existing. Further, since the number of traffic flows in a network at any given time can extend into the hundred, thousands, and even millions, it is often hard to assess which of the flows actually caused the traffic analyzer to determine that an anomaly is present.

To help with the assessment of the results from the anomaly detection, the system may provide data regarding the detected anomaly. For example, the traffic analyzer may provide information regarding the flows that were labeled anomalous to a user interface, so that a supervisor can provide further assessment of the traffic. In some embodiments, clustering can be used to help group traffic and/or network entities that exhibit similar behaviors in the network, thus reducing the number of flows or entities that need to be reviewed (e.g., by having the supervisor review similarly behaving network entities as a group, etc.). However, even this can still lead to a large number of behavioral clusters that require attention from the supervisor, meaning that some prioritization may be needed for effective investigation.

Active Prioritization of Investigation Targets in Network Security

The techniques herein allow for the prioritization of behavioral clusters for review by leveraging external sources of intelligence, such as blacklists and/or results of sandboxing analysis. More specifically, in some aspects, the techniques herein can be used to prioritize clusters of similarly behaving network entities (e.g., as represented by their addresses, such as IPs or domain names) and flagged by an unsupervised traffic anomaly detector as anomalous/needing further review. In further aspects, the techniques herein can be used to identify redundancies between the external intelligence sources (e.g., redundant blacklists), with implications on cost savings.

Specifically, according to one or more embodiments of the disclosure as described in detail below, a device analyzes network traffic data using a clustering process, to identify a cluster of addresses associated with the network traffic data for which the associated network traffic has similar behavioral characteristics. The device calculates a set of rankings for the cluster by comparing the cluster to different sets of malicious addresses. The device aggregates the set of rankings into a final ranking by setting the rankings in the set as current rankings and iteratively calculating an average of any subset of the current rankings that comprises correlated rankings. The calculated average replaces the rankings in the subset as a current ranking. When none of the current rankings are correlated, the device performs an aggregation across all of the current rankings to form the final ranking. The device provides data indicative of the cluster for review by a supervisor, based on the final ranking. As would be appreciated, the ranking of one cluster is relative to the other clusters within the clustering result.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein, e.g., in conjunction with prioritization process 249.

Operationally, traffic analysis process 248 may leverage machine learning in either or both of the following scenarios:
1.) By using supervised learning to aid in the analysis of traffic by looking for new cases of known attacks. In this case, the learning by traffic analysis process 248 may entail generalizing the distinction between known examples of previous attacks and representative examples of benign traffic.
2.) By leveraging unsupervised learning, such as when insufficient examples of past attacks are available. In this case, traffic analysis process 248 may perform unsupervised anomaly detection and clustering on the monitored traffic.

In the latter case, traffic analysis process 248 may output a set/cluster of network entities that exhibit similar traffic behaviors/characteristics. In various embodiments, the network entities in the cluster may be represented by their addresses, such as domain names or IPs. In turn, traffic analysis process 248 may provide information regarding the outputted clusters to a supervisor, such as via a user interface or a system configured to perform additional analysis. However, in many cases, traffic analysis process 248 may output a very large number of clusters (e.g., hundreds, thousands, etc.) any of which may just as easily represent malicious campaigns as benign cooperation patterns (e.g., sub-services in cloud services like Dropbox). Accordingly, in various embodiments, traffic analysis process 248 may operate in conjunction with prioritization process 249, to prioritize which clusters are sent for additional review first.

In various embodiments, prioritization process 249 may be configured to assign rankings to the behavioral clusters by comparing a given cluster to a set of addresses deemed malicious. Such a set of addresses may be obtained through sandbox analysis of malware and/or as a blacklist from a security service. In one embodiment, prioritization process 249 may rank each cluster by determining a score for the cluster based on the overlap between the addresses in the cluster and the set of addresses deemed malicious. For example, if the cluster has three domains, two of which are in the blacklist (e.g., deemed malicious/in the set of malicious domains), prioritization process 249 may assign the cluster a score of 0.6666. In turn, prioritization process 249 may prioritize clusters for review by using this score in descending order.

In one embodiment, a different approach may be taken with respect to addresses obtained from a sandbox environment, as some of the observed traffic may involve communication with benign entities. In order to promote correct entities, prioritization process 249 may rank the clusters by first identifying which addresses/domains were contacted in the sandbox environment by a sufficient (e.g., threshold) number of samples. For example, say that a domain, xyz.test, was contacted by at least ten samples in the sandbox environment. If the threshold is set to ten or fewer, this domain may be used for purposes of scoring. In turn, prioritization process 249 may calculate a score equal to the portion of samples that contacted the addresses and were deemed malicious in the sandbox. Then, prioritization process 249 may determine a ranking for each cluster from traffic analysis process 248 as an average score of the selected domains from the sandbox. If no domains in a cluster were selected, the score of the cluster may be set to 0.

The above approach to ranking behavioral clusters works well when there is a single set of addresses deemed malicious. In further embodiments, however, different sets of malicious addresses may be available and used to prioritize the behavioral clusters for review. For example, multiple blacklists from different security services may be available to prioritization process 249. Using these different sets of addresses, prioritization process 249 may produce multiple rankings for a given cluster and aggregate the rankings into a final ranking, in various embodiments. As these rankings are aggregated, they are referred to herein as partial rankings.

In various embodiments, prioritization process 249 may use any number of averaging-based approaches, to aggregate partial rankings. Generally, these approaches assume that there is a single, true, underlying ranking, as well as that the partial rankings that are to be merged are just manifestations/observations of the true ranking. Alternatively, a round robin approach can be taken to aggregate the partial rankings, in some embodiments. For example, in one embodiment, prioritization process 249 may use a simple round-robin rank aggregation approach whereby the highest ranked clusters from each partial ranking are first put to the aggregated ranking, then second highest, and so on. This approach is preferred if there is no correlation between the partial rankings.

However, when ranking behavioral clusters, particularly using multiple blacklists, it cannot be said that all of the correlated or uncorrelated. Typically, some of the rankings may be correlated, while others are not. In various embodiments, prioritization process 249 may determine the degree of correlation between rankings by calculating a correlation coefficient such as the Kendall rank correlation coefficient, Spearman's rank correlation coefficient, or any other suitable correlation coefficient. Generally, the Kendall rank correlation coefficient depends on the number of inversions of pairs of objects which would be needed to transform one rank order into the other. In contrast, Spearman's rank correlation coefficient is defined as the Pearson correlation coefficient between the ranked variables.

To combine a mix of correlated and uncorrelated partial rankings, prioritization process 249 may use hierarchical aggregation, according to various embodiments. In general, this may entail prioritization process 249 first setting the partial rankings of the cluster as the current rankings. Then, prioritization process 249 may iteratively aggregate the rankings as follows:
- calculate correlation between all pairs of the current rankings,
- if none of the current rankings are correlated, use a round-robin based aggregation scheme to produce a single ranking,
- if there is at least one group of correlated rankings, aggregate correlated rankings within such group first using averaging-based methods, producing one aggregated ranking per group, and
- rankings that are not correlated with any other ranking are passed to the next iteration.

Figure 4:
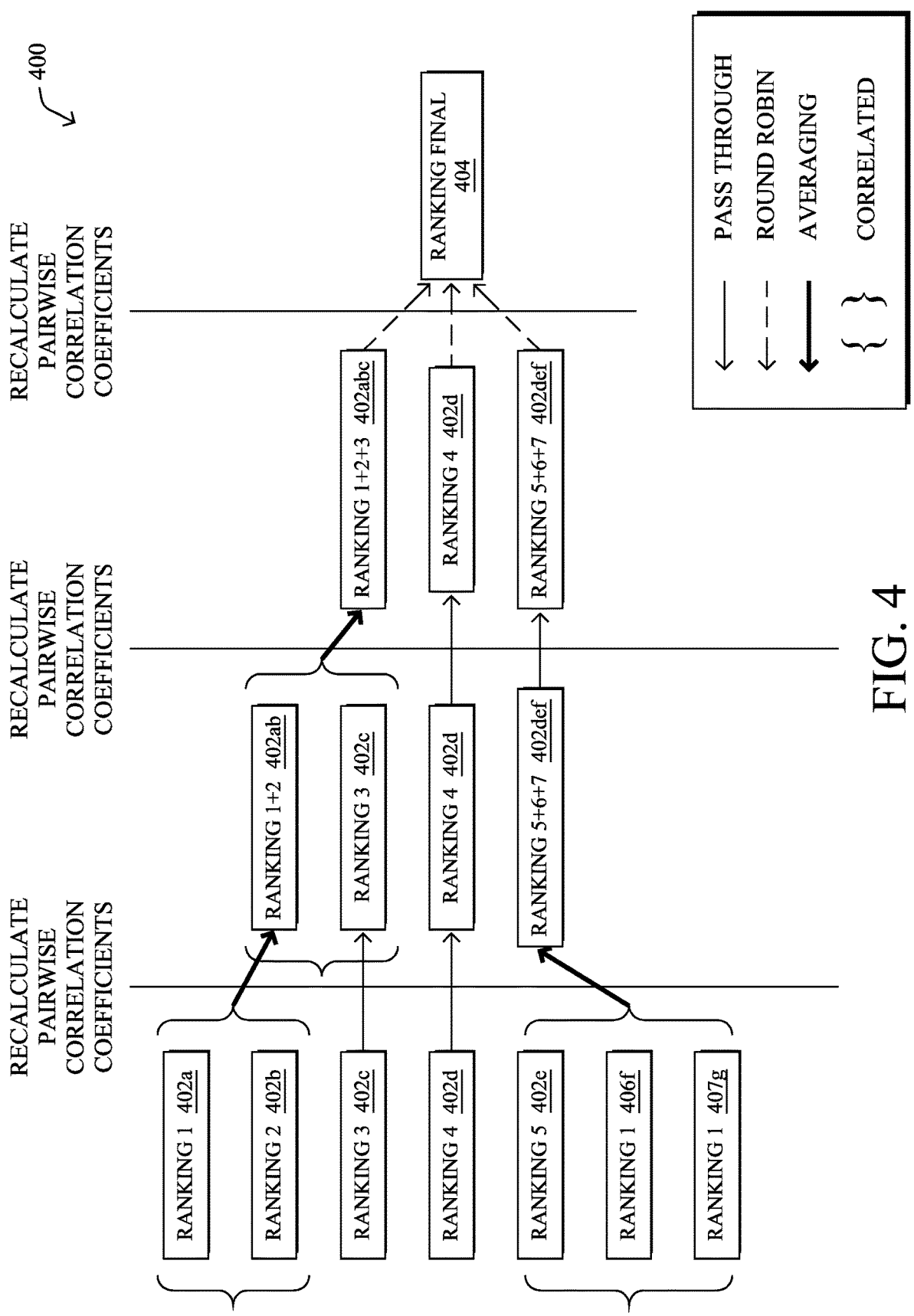
FIG. 4 illustrates an example of hierarchical rank aggregation.

FIG. 4 illustrates an example 400 of hierarchical rank aggregation, according to various embodiments. For purposes of illustration, assume that prioritization process 249 has compared a behavioral cluster of addresses to different sets of malicious addresses, resulting in seven partial rankings 402a-402g. During the first round of iteration, as shown, prioritization process 249 may set partial rankings 402*a*-402*g* as the current rankings under analysis and determine whether any of the current rankings are correlated (e.g., by computing rank correlation coefficients between rankings 402*a*-402*g*.

For purposes of illustration, assume that rankings 402*a*-402*b* are correlated and rankings 402*e*-402*g* are correlated. In some embodiments, therefore, prioritization process 249 may aggregate these sets of correlated rankings, such as by performing averaging aggregation on the two sets. More specifically, prioritization process 249 may average rankings 402*a*-402*b* into a new ranking 402*ab* that replaces rankings 402*a*-402*b* as current rankings in the next round of iteration. Similarly, prioritization process 249 may average rankings 402*e*-402*g* into a new ranking 402*efg* that replaces rankings 402*e*-402*g* in the next round of iteration. In one embodiment, since rankings 402*c* and 402*d* are uncorrelated to any of the other current rankings, they may pass through to the next round of iteration unchanged.

In the second round of iteration, prioritization process 249 may perform similar processing, as in the prior round, on the current rankings 402*ab*, 402*c*, 402*d*, and 402*efg*. Namely, prioritization process 249 may determine whether any of these rankings are themselves correlated. For example, assume that rankings 402*ab* and 402*c* are correlated. In such a case, prioritization process 249 may perform averaging aggregation on rankings 402*ab* and 402*c*, to form a new ranking 402*abc* that replaces 402*ab* and 402*c* as a current ranking in the subsequent round of iteration. Since current rankings 402*d* and 402*efg* are uncorrelated with any of the other current rankings, prioritization process 249 may pass these through to the third round of iteration unchanged.

In the third round of iteration, prioritization process 249 may determine that the current rankings 402*abc*, 402*d*, and 402*efg* are each uncorrelated with one another. When this happens, prioritization process 249 may aggregate all of the remaining current rankings into a final ranking 404 for the cluster. In some embodiments, for example, prioritization process 249 may use round robin aggregation on rankings 402*abc*, 402*d*, and 402*efg*, to form final ranking 404 for the cluster.

Instead of using basic round-robin aggregation to form the final ranking from uncorrelated rankings, prioritization process 249 may instead use an "active" rank aggregation technique, whereby an analyst gives feedback to prioritization process 249 via a user interface. Since the original goal of the ranking using blacklists, or other sets of malicious addresses, is to find as many malicious (yet unknown) behavioral clusters as possible, the quality of the resulting aggregation can be measured by number of malicious clusters found within top K ranked clusters, also known as precision@K.

By employing active rank aggregation, the analyst can shape the ongoing aggregation as he or she sees fit. As an example, certain blacklists can produce rankings of clusters that have very high precision at the top, but the value of those clusters is low (e.g., the clusters represent low risk malware such as adware rather than bank Trojans). In such a case, the analyst can set the value of adware clusters to be 0.

In another embodiment, prioritization process 249 may use a repeat-until-fail rank aggregation mechanism, instead of a round robin approach. Here, the final partitioning may be constructed as follows:

draw from the first partial partitioning as long as drawn clusters are deemed valuable by the analyst;

when a cluster is drawn that is not valuable, move to the following partial ranking; and repeat until the aggregate ranking is finished, that is, no clusters are left in the partial rankings.

Figures 5A, 5B:
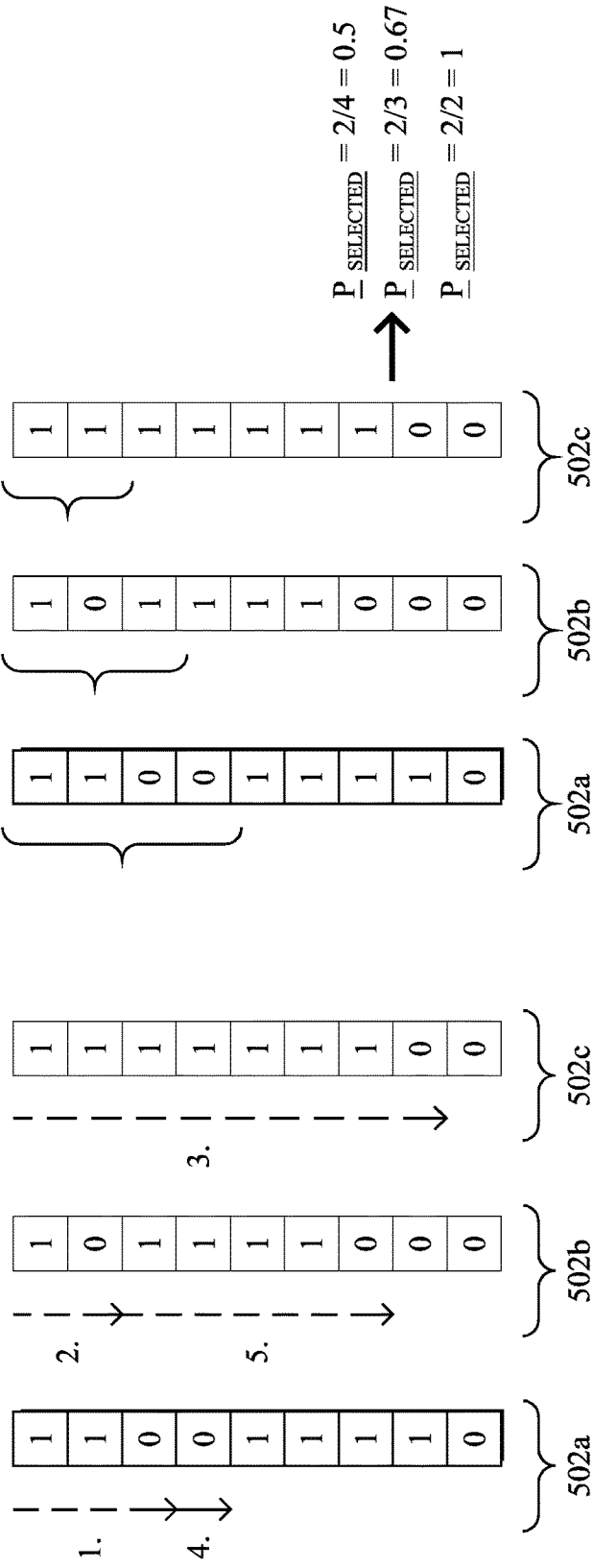
FIGS. 5A-5B illustrates examples of alternate rank aggregation approaches.

FIG. 5A illustrates an example 500 of the repeat-until-fail approach. For example, the analyst may provide feedback regarding the relevancy of the entries of sets 502*a*-502*c* in a repeat-until-fail manner, such as by continuing to pull entries from a given set 502 until an entry is deemed irrelevant (e.g., the cluster is assigned a value of '0' by the analyst). In turn, entries from the next set 502 may be pulled, until another irrelevant cluster is found.

In a further embodiment, another option is for prioritization process 249 to use probabilistic rank aggregation, which tracks the empirical probabilities of drawing a valuable cluster from partial rankings. This ranking aggregation first randomly selects a partial ranking to draw from, according to the empirical probabilities and then selects the highest ranked cluster that is not already present in the aggregated ranking. Prioritization process 249 may then present the selected cluster to the analyst, who then provides a response as to whether the cluster is valuable or not. Prioritization process 249 can then use this answer to recalculate the empirical probability of drawing a valuable cluster from the selected partial ranking after each draw. In turn, prioritization process 249 may repeat this selection process until the aggregated ranking contains all the clusters.

FIG. 5B illustrates an example of probabilistic rank aggregation. For example, consider the same sets of entries 502*a*-502*c* as in FIG. 5A. Using probabilistic rank aggregation, prioritization process 249 may randomly select entries from sets 502*a*-502*c* and determine their probabilities based on the relevancy feedback from the analyst. For example, prioritization process 249 may assign the first set 502*a* a probability of 0.5, if the first four entries are randomly selected, but only two of the four were deemed relevant. Similarly, set 502*b* may have a probability of 0.67 if two of the three randomly selected entries are relevant and set 502*c* may have a probability of 1, if both of its randomly selected entries are relevant.

In further embodiments, prioritization process 249 can also be configured to identify redundant blacklists, or other sets of malicious addresses, by looking for highly correlated groups of rankings. Notably, if the correlation within a group is particularly high, some of the blacklists can be removed without significantly changing the results of averaging-based aggregation. In an extreme case, prioritization process 249 may replace the whole group with a single ranking.

In contrast, a naive approach to identification of redundant blacklist might be for prioritization process 249 to look for overlaps between the blacklists. Doing so, however, does not reflect how well the blacklists project onto the data that is under investigation. In the case in which the blacklists are provided by a paid service, this can help to reduce costs, as redundant blacklists can be eliminated from use.

Blacklist recall can also be improved using the techniques herein by viewing the behavioral clusters from another perspective. Notably, if any cluster also forms a (disconnected) clique (e.g., with high edge weights, if the graph is weighted) one can safely assume that all domains fulfil the same purpose. Consequently, if any of the domains are present in blacklists, domains from the whole cluster can be considered malicious and can be used as an extension of this blacklist. This observation is especially important for adware campaigns and/or other malicious campaigns that are aggressively monetizing. Such campaigns tend to use large number of hosts with the same, distinctive, behavior.

Figure 6:
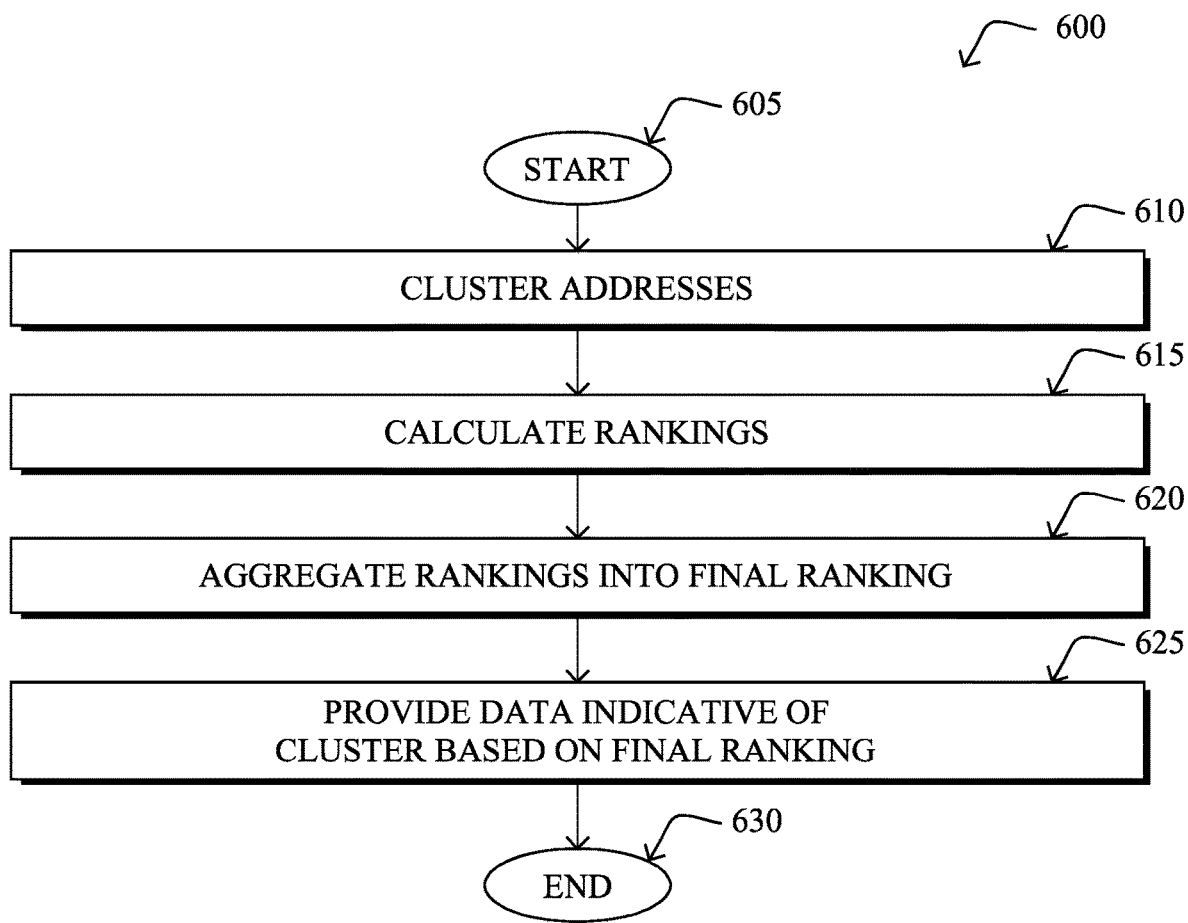
FIG. 6 illustrates an example simplified procedure for prioritizing investigation targets.

FIG. 6 illustrates an example simplified procedure for prioritizing investigation targets in a network, in accordance with one or more embodiments described herein. For example, a non-generic, specifically configured device (e.g., device 200) may perform procedure 600 by executing stored instructions (e.g., process 248 and/or 249). The procedure 600 may start at step 605, and continues to step 610, where, as described in greater detail above, the device may cluster a set of network addresses by analyzing network traffic data using a clustering process. In particular, the device may identify a cluster of addresses associated with the network traffic data for which the associated network traffic has similar behavioral characteristics. In various embodiments, the addresses may be IPs or domains that identify endpoint network entities associated with the traffic.

At step 615, as detailed above, the device may calculate rankings for the cluster of addresses by comparing the cluster of addresses to different sets of addresses deemed malicious. Such sets of malicious addresses may comprise blacklists (e.g., from threat intelligence services) and/or results from executing malware in a sandbox environment and observing the resulting traffic. In some embodiments, the device may calculate the rankings based on the percentage of the cluster that appear in a given set of addresses deemed malicious. For example, if there are five addresses in the cluster and three appear in a given blacklist, the device may assign the cluster a ranking of 0.6.

At step 620, the device may aggregate the rankings into a final ranking, as described in greater detail above. In some embodiments, the device may do so by iteratively determining whether any of the rankings are correlated (e.g., by calculating a ranking correlation coefficient). If so, the device may perform aggregation on the correlated rankings, to form a new ranking that replaces the correlated rankings in the next round of iteration. When none of the current rankings in a given round of iteration are correlated with one another, the device may then aggregate the current rankings into a single, final ranking for the behavioral cluster of addresses. In various embodiments, this may entail performing a round robin aggregation, an active round robin aggregation that leverages feedback from a user/analyst, a repeat until fail approach, or probabilistic rank aggregation, as described above.

At step 625, as detailed above, the device may provide data indicative of the cluster of addresses for review by a supervisor, based on the final ranking of the cluster of addresses. For example, if the final ranking of the cluster places the cluster within the top n-number of clusters, the device may provide information regarding the cluster to the supervisor for review. In some embodiments, the device may provide the data to a user interface for review by a human user/supervisor. In further embodiments, the device may provide the data to another system that is partially or fully automated and configured to perform a deeper review of the behavioral cluster. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for improved rank aggregation which can be used to triage the review of behavioral clusters of network entities (e.g., as represented by IPs or domains). In contrast to other potential approaches, the techniques herein do not assume any relationship between rankings produced from various external intel sources (blacklists). Instead, the techniques herein are able to determine the relationship between them and adjust the group-wise aggregation, as needed. Also, the active rank aggregation introduced herein gives the analyst the option to affect the aggregated result according to her current needs. Additionally, unlike other potential rank aggregation methods, including methods as simple as weighted average, the proposed active rank aggregation does NOT need a learning phase. Hierarchical aggregation also introduces tools that can help reduce costs of obtaining external intelligence by identifying redundancies in the external intelligence, such as blacklists from threat intelligence feeds.

While there have been shown and described illustrative embodiments that provide for prioritizing investigation targets in a network, it is to be understood that various other adaptations and modifications may be made within the spirit and scope of the embodiments herein. For example, while certain embodiments are described herein with respect to using certain models for purposes of behavioral clustering and ranking clusters, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

analyzing, by a device, network traffic data of a computer network using a clustering process to identify a cluster of computer network addresses associated with the network traffic data for which associated network traffic of the network traffic data has similar behavioral characteristics;

determining, by the device, a set of rankings that rank the cluster of computer network addresses and a plurality of other clusters of computer network addresses by comparing the cluster of computer network addresses to different sets of computer network addresses deemed malicious, the set of rankings indicative of a priority for review of the cluster of computer network addresses with respect to the plurality of other clusters of computer network addresses;

aggregating, by the device, the set of rankings into a final ranking by setting rankings in the set as current rankings and iteratively:

calculating an average of any subset of the current rankings that comprises correlated rankings, wherein the calculated average replaces the rankings in the subset as a current ranking, and when none of the current rankings are correlated, performing an aggregation across all of the current rankings to form the final ranking; and providing, by the device and based on the final ranking of the cluster of computer network addresses, data indicative of the cluster of computer network addresses to an automation-based review system, wherein the automation-based review system is configured to confirm whether the cluster of computer network addresses is malicious.

2. The method as in claim 1, wherein at least one of the different sets of computer network addresses deemed malicious comprises a blacklist of computer network addresses.

3. The method as in claim 1, wherein at least one of the different sets of computer network addresses deemed malicious comprises a set of computer network addresses with which malware in a sandbox environment attempted to communicate.

4. The method as in claim 1, wherein the cluster of computer network addresses comprises a set of network domains.

5. The method as in claim 1, wherein performing the aggregation across all of the current rankings to form the final ranking comprises:
performing round robin aggregation across all of the current rankings to form the final ranking.

6. The method as in claim 5, wherein the round robin aggregation comprises active round robin aggregation, and wherein performing the round robin aggregation across all of the current rankings comprises:
using feedback from a user interface to adjust the current rankings.

7. The method as in claim 1, wherein performing the aggregation across all of the current rankings to form the final ranking comprises:
performing repeat-until-fail aggregation across all of the current rankings to form the final ranking.

8. The method as in claim 1, wherein performing the aggregation across all of the current rankings to form the final ranking comprises:
performing probabilistic rank aggregation across all of the current rankings to form the final ranking.

9. The method as in claim 1, further comprising:
determining a correlation coefficient between two or more of the current rankings; and
when the correlation coefficient is above a predefined threshold, flagging the sets of computer network addresses deemed malicious that are associated with the two or more current rankings as redundant.

10. An apparatus, comprising:
one or more network interfaces to communicate with a network;
a processor coupled to the network interfaces and configured to execute one or more processes; and
a memory configured to store a process executable by the processor, the process when executed configured to:
analyze network traffic data of the network using a clustering process, to identify a cluster of computer network addresses associated with the network traffic data for which associated network traffic of the network traffic data has similar behavioral characteristics;
determine a set of rankings that rank the cluster of computer network addresses and a plurality of other clusters of computer network addresses by comparing the cluster of computer network addresses to different sets of computer network addresses deemed malicious, the set of rankings indicative of a priority for review of the cluster of computer network addresses with respect to the plurality of other clusters of computer network addresses;
aggregate the set of rankings into a final ranking by setting rankings in the set as current rankings and iteratively:
calculating an average of any subset of the current rankings that comprises correlated rankings, wherein the calculated average replaces the rankings in the subset as a current ranking, and
when none of the current rankings are correlated, performing an aggregation across all of the current rankings to form the final ranking; and
provide, based on the final ranking of the cluster of computer network addresses, data indicative of the cluster of computer network addresses to an automation-based review system, wherein the automation-based review system is configured to confirm whether the cluster of computer network addresses is malicious.

11. The apparatus as in claim 10, wherein at least one of the different sets of computer network addresses deemed malicious comprises a blacklist of computer network addresses.

12. The apparatus as in claim 10, wherein at least one of the different sets of computer network addresses deemed malicious comprises a set of computer network addresses with which malware in a sandbox environment attempted to communicate.

13. The apparatus as in claim 10, wherein the cluster of computer network addresses comprises a set of network domains.

14. The apparatus as in claim 10, wherein the apparatus performs the aggregation across all of the current rankings to form the final ranking by:
performing round robin aggregation across all of the current rankings to form the final ranking.

15. The apparatus as in claim 14, wherein the round robin aggregation comprises active round robin aggregation, and wherein the apparatus performs the round robin aggregation across all of the current rankings by:
using feedback from a user interface to adjust the current rankings.

16. The apparatus as in claim 10, wherein the apparatus performs the aggregation across all of the current rankings to form the final ranking by:
performing repeat-until-fail aggregation across all of the current rankings to form the final ranking.

17. The apparatus as in claim 10, wherein the apparatus performs the aggregation across all of the current rankings to form the final ranking by:
performing probabilistic rank aggregation across all of the current rankings to form the final ranking.

18. The apparatus as in claim 10, wherein the process when executed is further configured to:
determine a correlation coefficient between two or more of the current rankings; and
when the correlation coefficient is above a predefined threshold, flag the sets of computer network addresses deemed malicious that are associated with the two or more current rankings as redundant.

19. The apparatus as in claim 10, wherein the apparatus provides the data indicative of the cluster of computer network addresses for review by a supervisor by:
providing the data indicative of the cluster of computer network addresses to a user interface.

20. A tangible, non-transitory, computer-readable medium storing program instructions that cause a computing device to execute a process comprising:
    analyzing, by the device, network traffic data of a computer network using a clustering process, to identify a cluster of computer network addresses associated with the network traffic data for which associated network traffic of the network traffic data has similar behavioral characteristics;
    determining, by the device, a set of rankings that rank the cluster of computer network addresses and a plurality of other clusters of computer network addresses by comparing the cluster of computer network addresses to different sets of computer network addresses deemed malicious, the set of rankings indicative of a priority for review of the cluster of computer network addresses with respect to the plurality of other clusters of computer network addresses;
    aggregating, by the device, the set of rankings into a final ranking by setting rankings in the set as current rankings and iteratively:
        calculating an average of any subset of the current rankings that comprises correlated rankings, wherein the calculated average replaces the rankings in the subset as a current ranking, and
        when none of the current rankings are correlated, performing an aggregation across all of the current rankings to form the final ranking; and
    providing, by the device and based on the final ranking of the cluster of computer network addresses, data indicative of the cluster of computer network addresses to an automation-based review system, wherein the automation-based review system is configured to confirm whether the cluster of computer network addresses is malicious.

* * * * *

UNITED STATES PATENT AND TRADEMARK OFFICE
CERTIFICATE OF CORRECTION

PATENT NO. : 10,904,271 B2
APPLICATION NO. : 15/789022
DATED : January 26, 2021
INVENTOR(S) : Jan Jusko It is certified that error appears in the above-identified patent and that said Letters Patent is hereby corrected as shown below:

In the Specification

Column 7, Line 27, please amend as shown:
attacks are also sometimes known as denial of service Column 1, Line 64, please amend as shown:
a device analyzes network traffic data using a clustering Column 2, Line 33, please amend as shown:
nodes typically communicate over the network by Column 3, Line 7, please amend as shown:
exchanged among the nodes/devices of the computer Column 3, Line 47, please amend as shown:
two links connected to the public Internet, with potentially Column 6, Line 60, please amend as shown:
ally, recall refers to the ratio of true positives to the sum of true Column 6, Line 62, please amend as shown:
of the model. Similarly, precision refers to the ratio of true In the Claims Column 17, Line 3, please amend as shown:
to execute a process, comprising:

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*